US010951820B2

(12) United States Patent
Jayaram et al.

(10) Patent No.: US 10,951,820 B2
(45) Date of Patent: Mar. 16, 2021

(54) SYSTEM AND METHOD FOR GENERATING A PLURALITY OF UNIQUE VIDEOS OF A SAME EVENT

(71) Applicant: Intel Corporation, Santa Clara, CA (US)

(72) Inventors: Sankar Jayaram, Pullman, WA (US); Ritesh Kale, Pullman, WA (US); Charles Dechenne, Pullman, WA (US); John Harrison, Pallouse, WA (US); Franklin W. Taylor, Issaquah, WA (US); Vikas K. Singh, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/443,770

(22) Filed: Jun. 17, 2019

(65) Prior Publication Data
US 2020/0145580 A1    May 7, 2020

Related U.S. Application Data

(63) Continuation of application No. 15/194,044, filed on Jun. 27, 2016, now Pat. No. 10,326,931, which is a (Continued)

(51) Int. Cl.
*H04N 5/232* (2006.01)
*H04N 5/77* (2006.01)
(Continued)

(52) U.S. Cl.
CPC ......... *H04N 5/23238* (2013.01); *G06F 3/048* (2013.01); *G11B 27/005* (2013.01);
(Continued)

(58) Field of Classification Search
CPC ............ H04N 5/23238; H04N 5/0733; H04N 5/23203; H04N 5/247; H04N 5/77;
(Continued)

(56) References Cited

U.S. PATENT DOCUMENTS

7,619,683 B2  11/2009  Davis
9,204,041 B1  12/2015  Campbell
(Continued)

*Primary Examiner* — Mishawn N. Hunter
(74) *Attorney, Agent, or Firm* — Nicholson De Vos Webster & Elliott LLP (57) ABSTRACT

An apparatus and method are provided for viewing panoramic images and videos through the selection of a particular viewing angle and window (zoom) within that panorama while allowing the viewer to simultaneously implement temporal transport control, allowing the video to be in a state of pause, play, fast forward, fast rewind, slow forward, slow rewind, or frame-by-frame. This capability may be used on video that is residing in memory on the viewer's viewing system, in a hard disk local to the viewer or in a shared location, or on a live buffered feed of video. A second capability of this apparatus and method relates to the use of a plurality of panoramic video or images from multiple synchronized cameras. In those cases, all panoramic video feeds are synchronized so that as a viewer pauses, rewinds, forwards a video in one panorama, all panoramas are time synchronized and go through the same states as the panorama being viewed. When the user selects a different panorama for viewing from a different camera, this panorama comes up in the same state as the panorama previously being viewed.

20 Claims, 10 Drawing Sheets

Related U.S. Application Data continuation of application No. 14/968,712, filed on Dec. 14, 2015, now Pat. No. 9,413,957, which is a continuation of application No. 13/843,599, filed on Mar. 15, 2013, now Pat. No. 9,241,103.

(51) Int. Cl.

| | | |
|---|---|---|
| *H04N 9/79* | (2006.01) | |
| *H04N 21/218* | (2011.01) | |
| *H04N 21/81* | (2011.01) | |
| *H04N 5/073* | (2006.01) | |
| *H04N 5/247* | (2006.01) | |
| *G11B 27/10* | (2006.01) | |
| *H04N 7/18* | (2006.01) | |
| *G11B 27/00* | (2006.01) | |
| *G06F 3/048* | (2013.01) | |

(52) U.S. Cl.
CPC ............ *G11B 27/10* (2013.01); *G11B 27/105* (2013.01); *H04N 5/0733* (2013.01); *H04N 5/23203* (2013.01); *H04N 5/247* (2013.01); *H04N 5/77* (2013.01); *H04N 7/181* (2013.01); *H04N 9/79* (2013.01); *H04N 21/21805* (2013.01); *H04N 21/816* (2013.01)

(58) Field of Classification Search
CPC .... H04N 7/181; H04N 9/79; H04N 21/21805; H04N 21/816
See application file for complete search history.

(56) References Cited

U.S. PATENT DOCUMENTS

| | | |
|---|---|---|
| 2004/0075738 A1 | 4/2004 | Burke et al. |
| 2004/0162154 A1 | 8/2004 | Dejohn |
| 2005/0091311 A1 | 4/2005 | Lund et al. |
| 2005/0198213 A1 | 9/2005 | Watanabe et al. |
| 2009/0041293 A1 | 2/2009 | Andrew et al. |
| 2010/0238264 A1 | 9/2010 | Liu et al. |
| 2010/0265314 A1* | 10/2010 | Nakashio .............. G06T 3/4038 348/36 |
| 2011/0083073 A1 | 4/2011 | Atkins et al. |
| 2013/0176384 A1 | 7/2013 | Jones et al. |
| 2013/0202265 A1 | 8/2013 | Arrasvuori et al. |
| 2013/0286678 A1 | 10/2013 | Sugiyama et al. |
| 2014/0168091 A1 | 6/2014 | Jones |
| 2014/0253693 A1 | 9/2014 | Shikata |
| 2014/0270684 A1 | 9/2014 | Jayaram et al. |
| 2014/0306963 A1 | 10/2014 | Sun et al. |
| 2014/0368719 A1 | 12/2014 | Kaneko et al. |

* cited by examiner

SYSTEM AND METHOD FOR GENERATING A PLURALITY OF UNIQUE VIDEOS OF A SAME EVENT

CROSS-REFERENCE TO RELATED APPLICATIONS

This application is a continuation of U.S. patent application Ser. No. 15/194,044, filed Jun. 27, 2016; which is a continuation of U.S. patent application Ser. No. 14/968,712, filed Dec. 14, 2015; which is a continuation of U.S. patent application Ser. No. 13/843,599, filed Mar. 15, 2013, and which is hereby incorporated by reference.

TECHNICAL FIELD

This disclosure pertains to videography, image capture, and playback. More particularly, this disclosure relates to systems and methods for receiving, storing, and viewing a panoramic video or a plurality of panoramic videos with simultaneous control over the playback, as well as the viewing viewport and synchronization between the multiple panoramic videos.

BACKGROUND OF THE INVENTION

Techniques are known for capturing and viewing panoramic images. Most techniques involve a capture system that captures and processes a series of images to form panoramic images. Sequences of these images form panoramic videos. Techniques for viewing panoramic images typically include a user input method for viewing a portion of the panoramic image on a screen, giving the user a feel of being able to look around in the panoramic image.

Techniques are also known for transport controls using a buffer of a live video feed. These controls allow a viewer to buffer a live feed on a local device and forward, rewind, pause, and jog through the buffered video.

However, the above known techniques fall short and there is a need to for an apparatus and a method that enables a user to make use of both of the above mentioned capabilities in order to provide a unique viewing experience with multiple panoramic videos.

SUMMARY OF THE INVENTION

An array of monoscopic detectors, as well as an array of stereoscopic pairs of detectors, are provided in order to capture information from a surrounding environment, such as monoscopic images or stereoscopic images, and audio inputs from ranges exceeding that for a single detector or stereoscopic pair of detectors. For the case of image inputs, stereoscopic pairs of cameras are provided in an array. A combined unit of monoscopic or stereoscopic detectors with processing circuitry configured to create panoramic image data for panoramic videos is referred to in herein as a Panoramic Video Camera Head. The video data from a Panoramic Video Camera Head can be streamed to a viewer, or recorded in computer memory or storage, and retrieved by a viewer and viewed using user interface devices for control.

According to one aspect, an apparatus and method are provided for receiving a video stream from a Panoramic Video Camera Head or from a local storage disk, storing the video data in a local memory buffer, and viewing regions of interest within the panoramic video using user interface devices. The user interface device allows the viewer to choose a viewing angle and zoom value which gives the user a feeling of "controlling" the camera's pan, tilt, and zoom, independent of other viewers who may be using different user interface devices and viewing displays. A different aspect of the user interface allows the viewer to pause the video at any time, rewind, forward, play, skip to the start, skip forward or skip back within that buffer while the live feed continues to fill the buffer, or replace the buffer (in a circular buffer). A combination of these two aspects allows a unique experience for the viewer where the viewer is able to rewind, pause, forward, or step through a video multiple times but can see a different portion of the video each time by changing the pan, tilt, or zoom at the same time.

According to another aspect, an apparatus and methods are provided for receiving a plurality of time synchronized video streams from a plurality of Panoramic Video Camera Heads or from a local storage disk, storing the plurality of video data in a local memory buffer, and viewing regions of interest within any one of the panoramic videos using user interface devices. The user interface device allows the viewer to choose a viewing angle and zoom value for each video stream which gives the user a feeling of "controlling" that specific camera's pan, tilt, and zoom, independent of other viewers who may be using different user interface devices and viewing displays and independent of the pan, tilt, and zoom of the other panoramic video streams. A different aspect of the user interface allows the viewer to synchronously pause all the videos at any time, rewind, forward, play, skip to the start, skip forward or skip back within that buffer while the live feeds continue to fill the buffer, or replace the buffer (in a circular buffer). A combination of these two aspects allows a unique experience for the viewer where the viewer is able to rewind, pause, forward, or step through a video multiple times, but can see a different portion of the video each time by changing the pan, tilt, or zoom at the same time. This different portion is from a uniquely different point of view. It also allows the user to switch to a different panoramic camera feed at any given time during the playback to not only look at the same moment in time from a different viewing angle and zoom from one camera location, but also a different viewing angle and zoom from a different camera location while continuing to be in the same state of pause, play, forward, or rewind, and at the same exact instant in time (within device tolerances).

BRIEF DESCRIPTION OF THE DRAWINGS

Preferred embodiments of the disclosure are described below with reference to the following accompanying drawings.

FIG. 3 is a schematic diagram showing how multiple panoramic video feeds can be received at a client by a receiver and user interface that also has controller functionality built in.

FIGS. 8-a and 8-b are two parts of a flowchart showing how the Transport Control Events are handled by the system and how the time stamp for the frame to be displayed to the user is determined based on the Video Playback State of the viewer application.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

Embodiments of the present invention disclose an apparatus and method for receiving a video stream from a plurality of Panoramic Video Camera Heads or from a local storage disk, storing the video data in a local memory buffer, and viewing regions of interest within any one of the panoramic videos using user interface devices, while controlling the video time, playback speed, and playback direction globally across all panoramic video data in a synchronous manner. According to one construction, multiple Panoramic Video Camera Heads and are synchronized through a time code generator that triggers the image capture across all camera heads synchronously. According to another construction, multiple camera heads are synchronized by one "Master" camera head that sends trigger signals to all the camera heads. Further, according to yet another construction, each camera head is set to "free-run" with a pre-defined frame rate, and the processing computers all capture the latest frame from each of these cameras and timestamp them with a time code from a time code generator.

Various embodiments herein are described with reference to FIGS. 1-9. However, certain embodiments may be practiced without one or more of these specific details, or in combination with other known methods and configurations. In the following description, numerous specific details are set forth, such as specific configurations and methods, etc., in order to provide a thorough understanding of the present disclosure. In other instances, well-known construction techniques and methods have not been described in particular detail in order to not unnecessarily obscure the present disclosure. Reference throughout this specification to "one embodiment" or "an embodiment" means that a particular feature, configuration, composition, or characteristic described in connection with the embodiment is included in at least one embodiment. Thus, the appearances of the phrase "in one embodiment" or "an embodiment" in various places throughout this specification are not necessarily referring to the same embodiment. Furthermore, the particular features, configurations, compositions, or characteristics may be combined in any suitable manner in one or more embodiments.

As used herein, the term "Transport Control" is understood to mean a user interface that allows a viewer to control the video playback, such as choosing between play, pause, rewind and forward, and the speed of rewind or forward.

Figure 1:
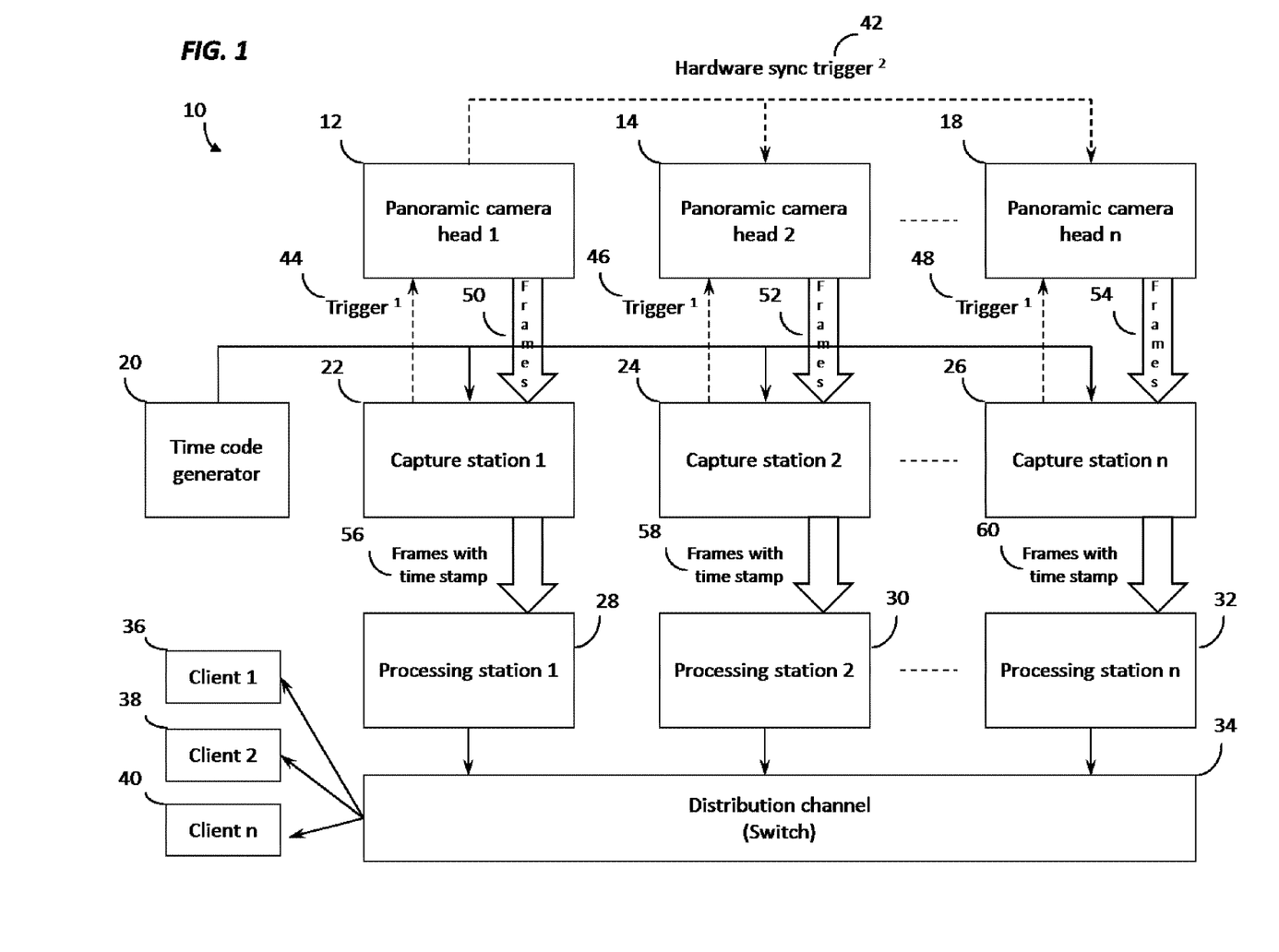
FIG. 1 is a schematic diagram showing unique embodiments of time code synchronization mechanisms that could be used to synchronize frames being captured by capture stations from a plurality of panoramic camera heads before being processed and distributed.

FIG. 1 shows construction of the time code synchronization mechanism 10 extending across a plurality of panoramic camera heads 12, 14 and 18 and capture stations 22, 24 and 25. A time code generator 20 is used to get a consistent time stamp based on the desired rate that frames 50, 52 and 54 need to be captured from the panoramic cameras 12, 14 and 18. The same time code from time code generator 20 is received by each of the Capture Stations 22, 24 and 26, and in one of the embodiments of this mechanism, the time code is used to trigger[1] 44, 46 and 48 the panoramic cameras 12, 14 and 18. This is also referred to as a "software trigger" 44, 46 and 48 of the panoramic cameras 12, 14 and 18. The panoramic cameras 12, 14 and 18 capture a frame 50, 52 and 54 when triggered by trigger 44, 46 and 48, respectively, and return the frame 50, 52 and 54 to the corresponding Capture Stations 22, 24 and 26 that generated the trigger 44, 46 and 48. The Capture Stations 22, 24 and 26 attach the time-stamp information from the time code to the frames, forming "frames with time stamps" 56, 58 and 60. Because the time-code is shared between Capture Stations 22, 24 and 26, the frames 56. 58 and 60 generated from each of the Capture Stations 22, 24 and 26 for a given time-code are synchronized, as they have the same timestamp. These frames 56, 58 and 60 are then transmitted to the Processing Station 28, 30 and 32, respectively, where they are compressed for transmission over the network and sent to some Distribution Channel 34. The time-stamp information on the frames 56, 58 and 60 is maintained throughout this processing, compression, and distribution process. The distribution device, or channel (switch) 34 is configured to distribute the processed images or compressed video stream to client processors in clients 36, 38 and 40. Clients 36, 38 and 40 also include memory.

Another embodiment of the time code synchronization mechanism 10 of FIG. 1 involves triggering the panoramic camera heads 12, 14 and 18 using a "hardware sync trigger[2]" 42. The hardware trigger 42 is generated at specific time intervals based on the desired frame rate. This rate of hardware triggering has to match the rate of time codes being generated by the time code generator 20. One of the panoramic camera heads 12, 14 and 18 acts as a "Master" and all other panoramic camera heads 12, 14 and 18 act as "Slaves". The "Master" panoramic camera triggers itself and all the "Slave" panoramic cameras synchronously. When a trigger is generated, a frame is captured at the panoramic camera 50, 52 or 54. Once the frame 50, 52 or 54 is captured, an event is invoked at the Capture Station 22, 24 or 26, and this is when the Capture Station 22, 24 or 26 "grabs" the frame from the camera 12, 14 or 18, and associates the time stamp corresponding to the latest time-code received from the time-code generator 20 to the frame 50, 52 or 54.

A third embodiment of the time code synchronization mechanism 10 of FIG. 1 involves letting the panoramic cameras 12, 14 and 18 capture frames in a "free run" mode, where each of the panoramic cameras 12, 14 and 18 trigger as fast as possible. The Capture Station 22, 24 and 26 uses the time code signal to "grab" the latest frame 50, 52 or 54 that was captured by the panoramic camera 12, 14 or 18, and associates the time stamp corresponding to the time-code with the frame.

Figure 2:
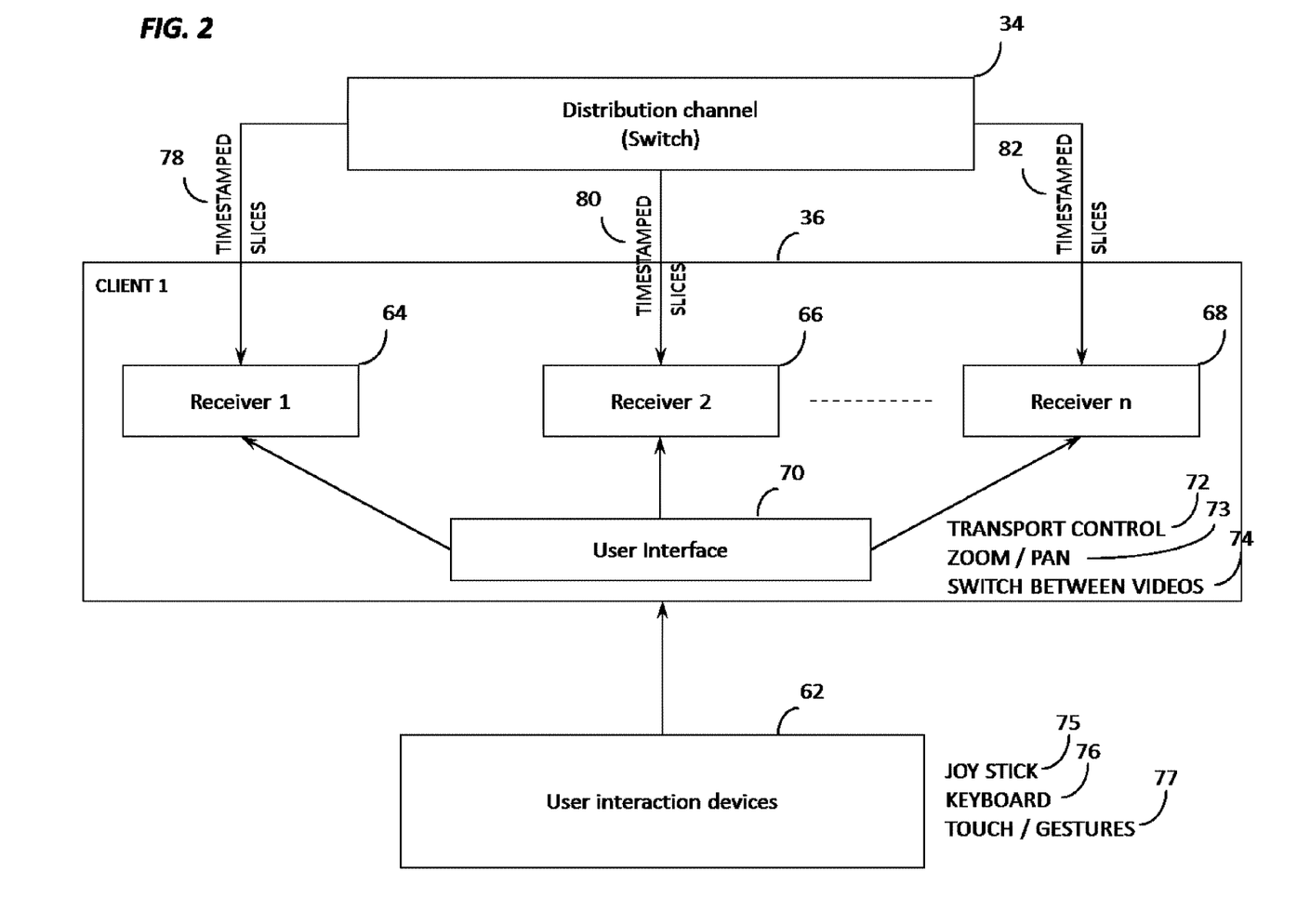
FIG. 2 is a schematic diagram showing how multiple receivers, or receiving modules on a viewer machine would receive time-stamped frames from the panoramic video feeds, and to show the user interface as the intermediate application for managing how the user input requests are handled and how the clients are manipulated to cater to the user request.

FIG. 2 shows multiple receivers 64, 66 and 68 on a client machine 36 receiving time-stamped slices 78, 80 and 82, respectively, from the panoramic video feeds via distribution channel 34. A user interface 70 on the client machine 36 determines which receiver is the active receiver 64, 66 or 68 displayed to the user. User interface 70 also manages the user interaction input from devices 62 like a joystick 75, a keyboard 76, and a touch or gesture based device(s) 77. User interface 70 uses this input to determine which client stream should be the active stream (switch between videos 74), and what section of the panoramic video should be displayed (zoom/tilt/pan 73) to the end-user. Another input from the user-interaction devices is the input related to transport control 72. User interface 70 uses this input and passes it on to all the receivers. This enables all the receivers to perform the same transport control operations to their respective panoramic video streams, and ensures that all the panoramic video streams are synchronized.

Figure 3:
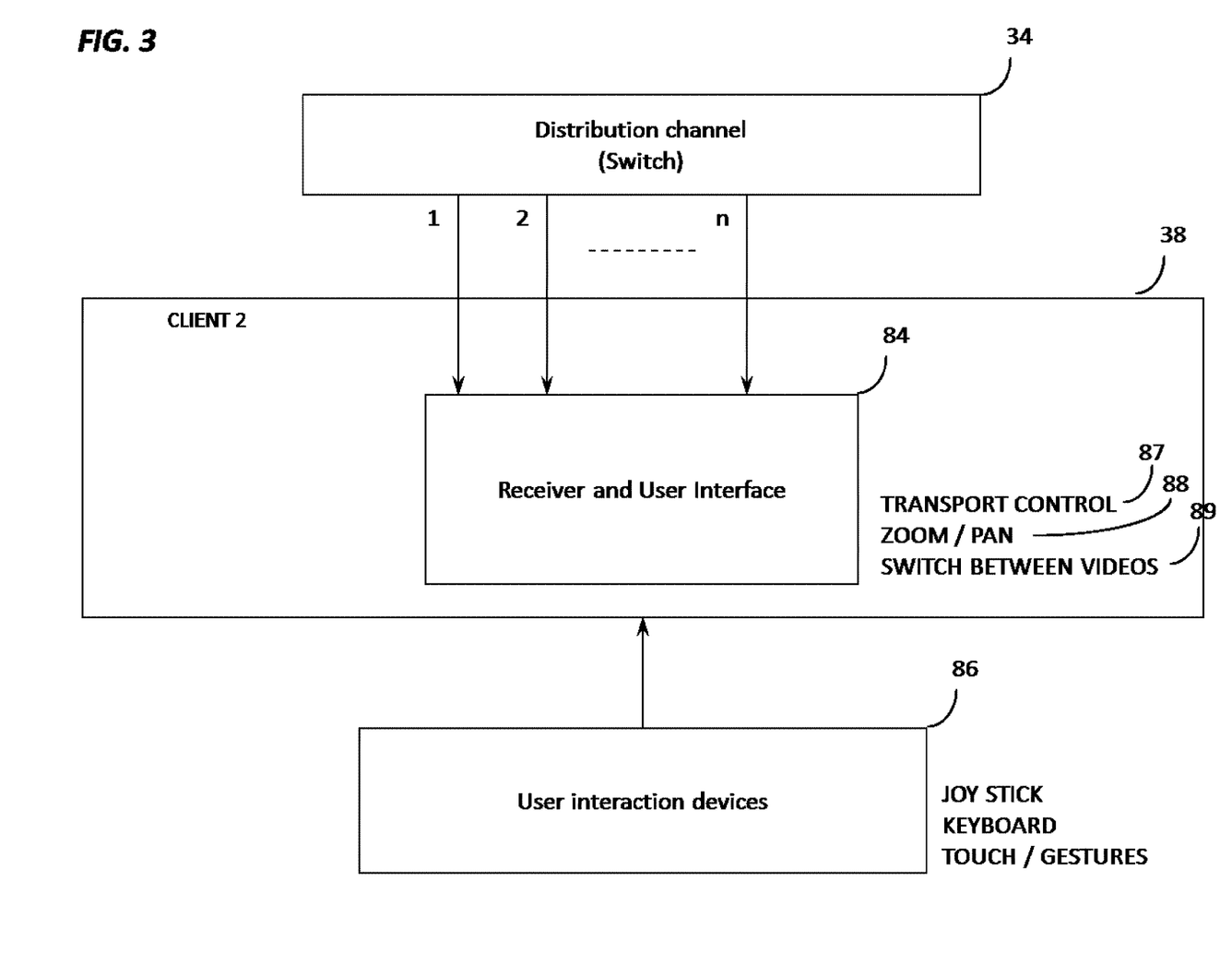

FIG. 3 shows another embodiment of the client application on the viewer machine. In this embodiment, a single application serves as the receiver and user interface 84. The receiver receives time-stamped frames for all the panoramic video streams via distribution channel 34 and manages each of these streams in its own application memory. The receiver also includes processing circuitry. User interface functionality described in FIG. 2 is also integrated in this application. As described in FIG. 2, the user interface manages the input from the user interaction devices 86 and performs the actions for switching between videos 89, what section of the panoramic video should be displayed (zoom/pan/tilt 88) to the end-user, and how to apply the transport control 87 to all the streams in memory.

Figure 4:
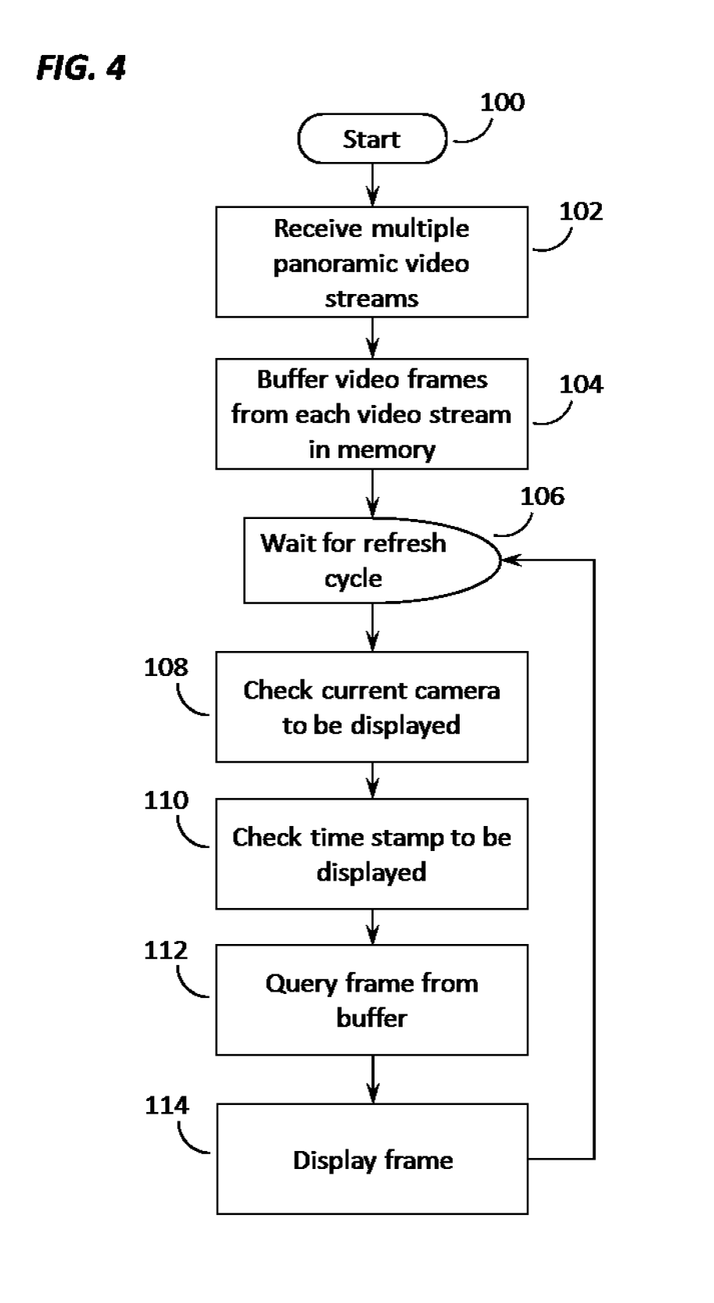
FIG. 4 is a flow chart showing the steps involved in a viewer machine to receive multiple panoramic video streams, to buffer the frames from each feed, and to determine the frame from the buffer to be displayed to the end user based on the camera in view and the time stamp sought by the user.

The following variables are stored with the controller module for receiver and user interface 84 that determine the state of the view that is displayed to the end-user:
 a. Current Camera to be displayed
 b. Current Time Stamp of the frame to be displayed
 c. Current Video Playback State—Possible values are Play, Pause, Fast Forward, Rewind, Live
 d. Current Viewport—The viewport is determined by the current zoom, pan, and tilt values The user interaction devices 86 could generate the following types of events that are handled by the receiver and user interface 84:
 a. Camera Changed Event
 b. Video Playback State Changed Event
 c. Viewport Changed Event
 d. Transport Control Event FIG. 4 shows the steps involved in a viewer machine to receive multiple panoramic video streams and determine the frame to be displayed to the end user. The frames from each panoramic video stream that is received by the viewer machine 102 are buffered in memory (Hard disk drive, application memory, or any other form of storage device) 104. Each frame received by the viewer machine has a time-stamp associated with it, which serves as the key to synchronize frames across multiple panoramic streams. Once the frames have started buffering, the viewer application enters a refresh cycle loop starting with a "wait for refresh cycle" 106. The refresh cycle is a periodic set of operations performed by the application at every refresh interval of the display. The viewing application stores the information about the panoramic camera being displayed 108 and the information about the time stamp to be displayed based on the playback state of the application and user inputs related to transport controls. For each refresh cycle, the application checks the current panoramic camera that needs to be displayed, and then checks for the time stamp to be displayed 110. Using these two pieces of information, the appropriate frame to be displayed is sought from the buffer in memory 112. This frame is then passed on to the application for display 114 in that refresh cycle.

Figure 5:
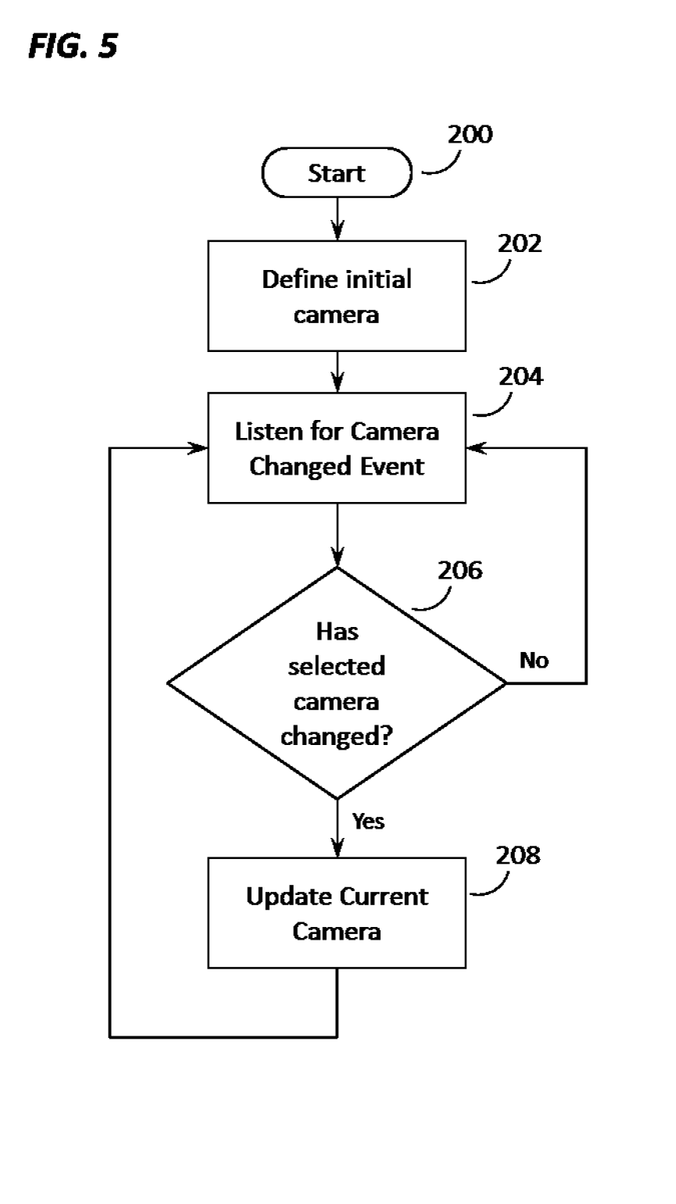
FIG. 5 is a flow chart showing the steps involved in handling a Camera Changed Event triggered by the user.

FIG. 5 shows the steps involved in handling the Camera Changed Event triggered by the user. An initial camera is used, or defined 202 as the default after initiating a start 200. Then the application goes into a 'listen' mode 204 where it is waiting for Camera Changed Events 206 triggered by the user interaction devices. When a request for changing the selected camera is received, the local variable in the application that stores current camera information is updated 208, and the application goes back into the 'listen' mode, waiting for the next Camera Changed Event.

Figure 6:
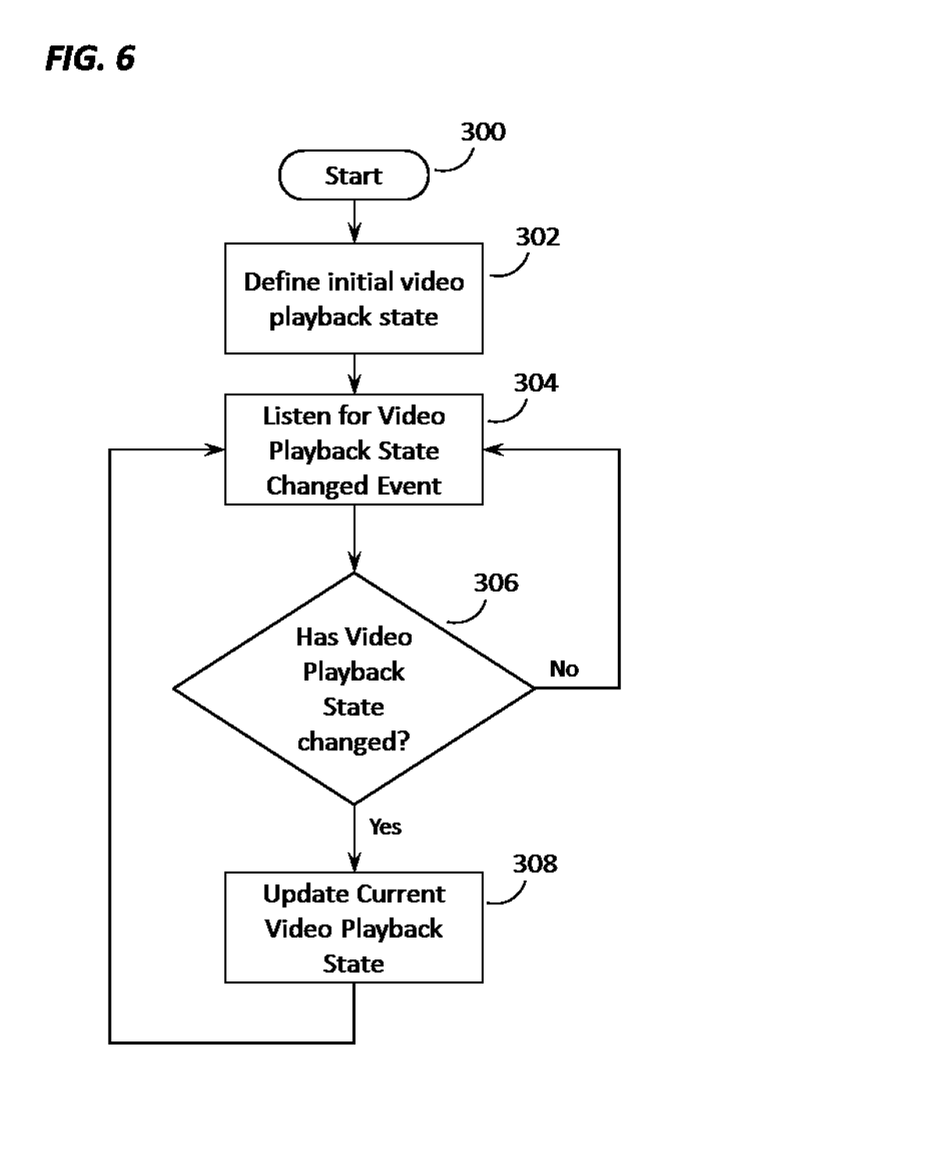
FIG. 6 is a flow chart showing the steps involved in handling a Video Playback State Changed Event triggered by the user.

FIG. 6 shows the steps involved in handling the Video Playback State Changed Event triggered by the user from start 300. An initial video playback state 302 is used as the default to start with. Then the application goes into a 'listen' mode 304 where it is waiting for Video Playback State Changed Events 306 triggered by the user interaction devices. When a request for changing the video playback state is received, the local variable in the application that stores the current video playback state is updated 308, and the application goes back in the 'listen' mode, waiting for the next Video Playback State Changed event.

Figure 7:
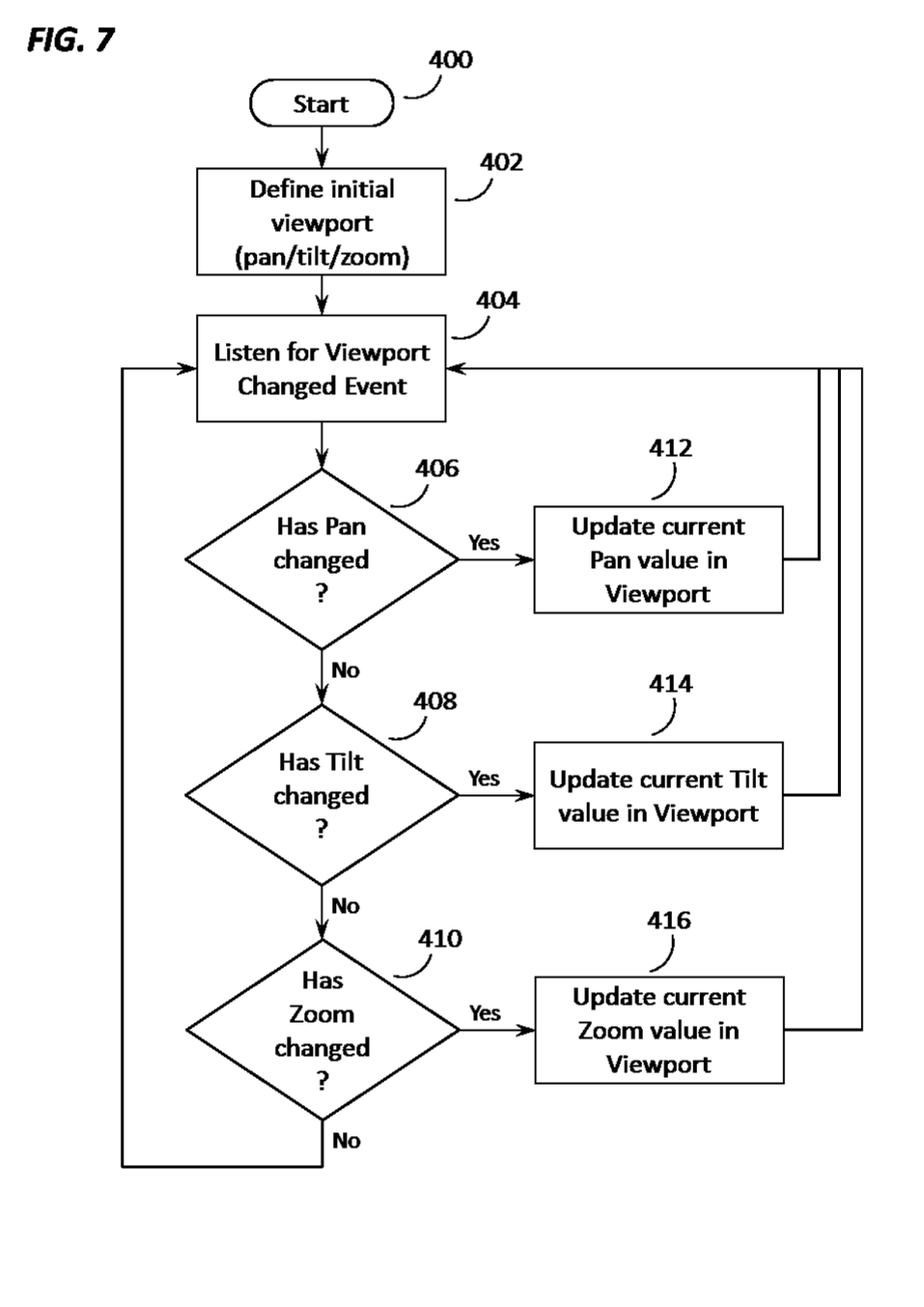
FIG. 7 is a flow chart showing the steps involved in handling a Viewport Changed Event triggered by the user.
Figure 8:
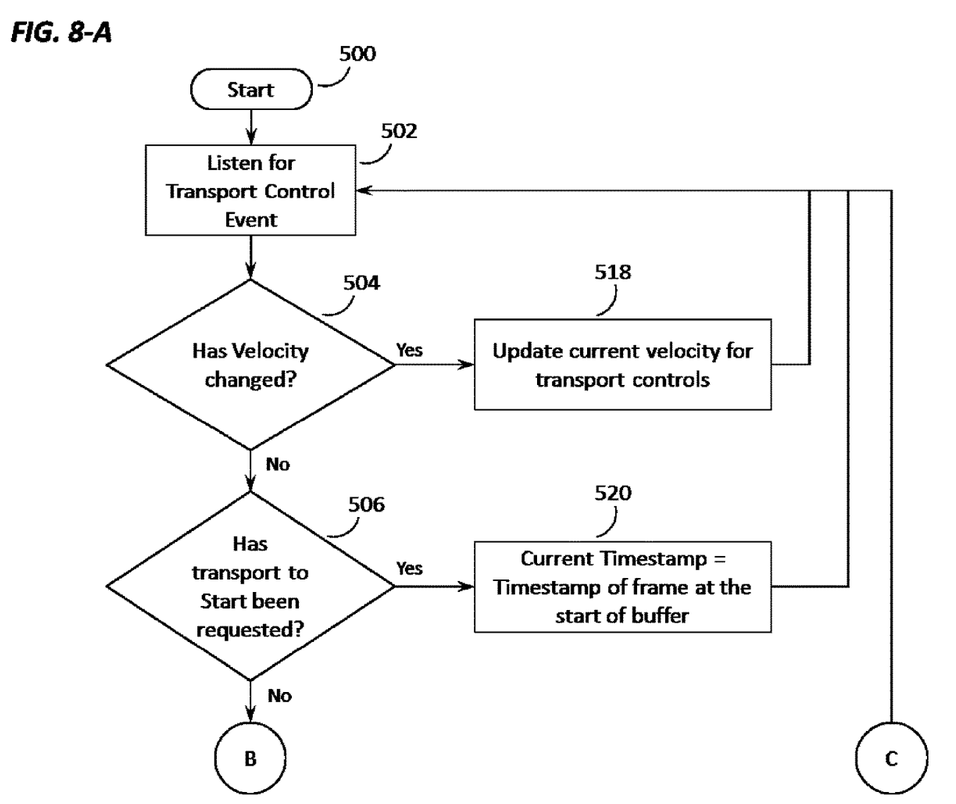

FIG. 7 shows the steps involved in handling the Viewport Changed Event triggered by the user from start 400. The viewport could be changed by changing the zoom, tilt, or pan. An initial zoom, tilt, and pan is used as a default 402 to start with. Then the application goes into a 'listen' mode 404 where it is waiting for Viewport Changed Events triggered by the user interaction devices. When a request for changing the viewport is received, the application checks to see if the zoom 410, pan 406, or tilt 408 value has been changes, and updates the local variables 416, 412 and 414, respectively in the application that store the zoom, pan, and tilt. The application then goes back in the 'listen' mode, waiting for the next Viewport Changed Event.

FIGS. 8a and 8b show how the Transport Control Events are handled by the viewing application initiated at start 500. The application is listening for Transport Control Changed Events 502. The application checks to see if the velocity of transport control was changed 504. If the velocity was changed, the value of the velocity stored within the application is updated 518 and the application goes back to listening for Transport Control Changed Events. If velocity has not changed, then the application checks to see if the user has requested to "Transport to Start" 506 so that they view the start of the buffered video stream in memory. If "Transport to Start" was requested, the value of the current timestamp to display is changed to be the same as the timestamp of the frame at the start of the buffer in memory 520, and the application goes back to listening for Transport Control Changed Events. If "Transport to Start" was not requested, then the application determines the current timestamp to be used for display based on playback state that the application is in. If the application is in "Play" state 508, then the current timestamp is incremented to the next timestamp 522. If the application is in the "Pause" state 520, then the current timestamp is not changed 524. If the application is in the "Fast Forward" 512 or "Rewind" state 514, then the current timestamp is incremented 526 or decremented 528 taking the frame rate and velocity of transport into account. If the application is in the "Live" state 516, then the current timestamp is set to the timestamp of the frame at the end of buffered frames in memory 530.

Figure 9:
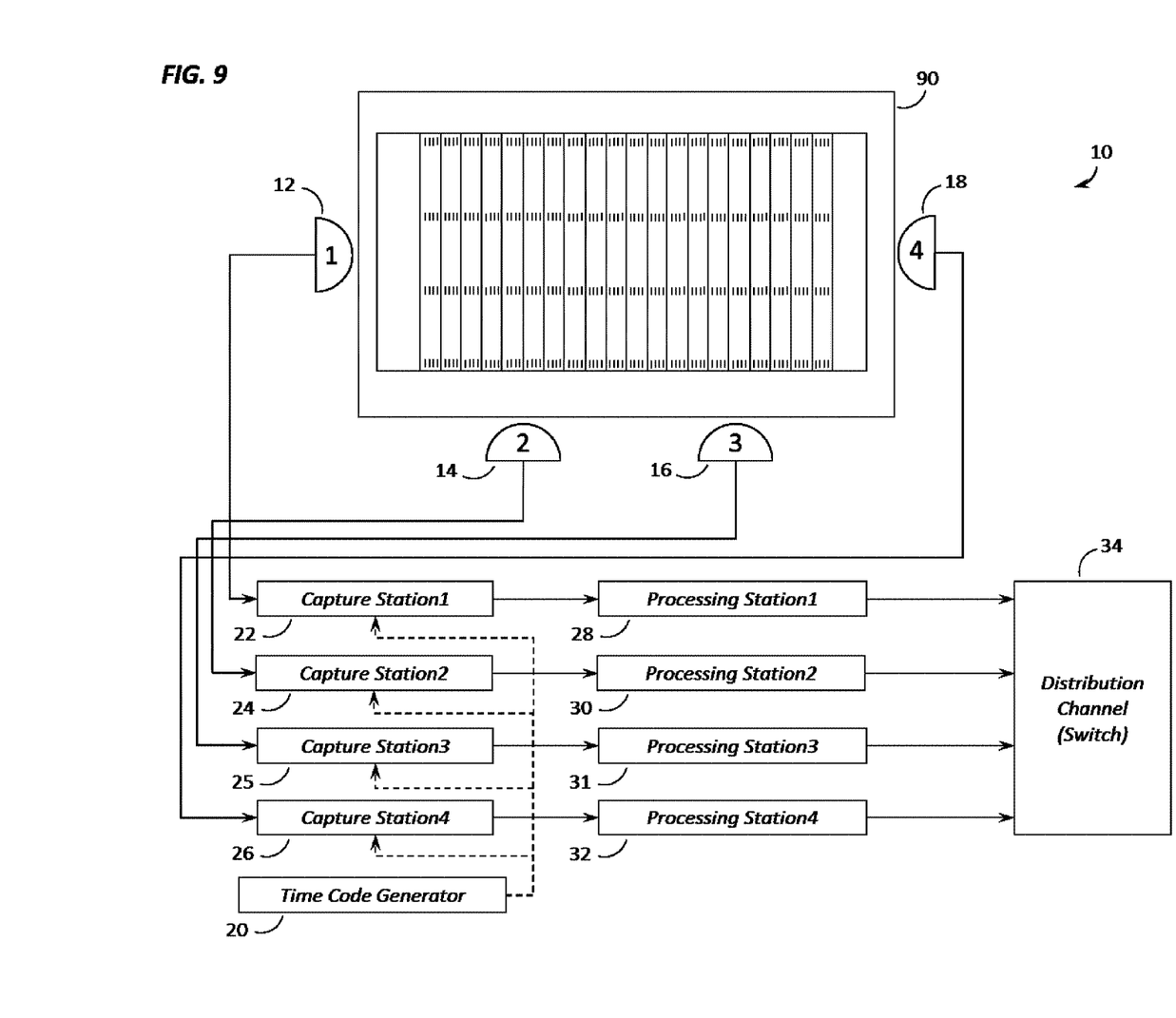
FIG. 9 shows how multiple panoramic cameras are strategically placed an event location and how they are connected to the capture stations, processing stations, and distribution channel.

FIG. 9 shows a football field 90 as the event location where multiple panoramic cameras 12, 14, 16 and 18 are located at strategic locations such that they provide different angles to view a sporting event from and allow one or more end-users to choose the angle that is best suited (for them) for viewing the event at any given point in time. Each of the panoramic video cameras 12, 14, 16 and 18 is connected to a capture station 22, 24, 25 and 26, respectively. Each capture station 22, 24, 25 and 26 receives a time-code from a time-code generator, and the time-stamp from the time-code is attached to the frames received from the panoramic video camera. The frames are then transmitted to the processing stations 28, 30, 31 and 32 where they are processed and streamed out to the distribution channel 34. Distribution channel 34 receives the frames and communicates the frames over a network to multiple clients that are connected to the distribution channel.

A panoramic video capture device as used herein comprises multiple sensors placed in a circular array such that a portion of image captured by each sensor overlaps with a portion of image captured by adjacent sensors. The overlapping images from the different sensors are captured synchronously based on a trigger mechanism, and these overlapping images form the basis for creation of a single, seamless panoramic image.

As used herein, a processor is a high-performance server-grade machine housing multiple graphic processing units (GPUs). A GPU is capable of performing large number of operations in parallel. The use of multiple GPUs in the processor allows for highly parallelized computations on multiple image frames being communicated by the panoramic video capture device. Memory can also be resident.

A processor comprises the following modules. First, a capture module is responsible for triggering the panoramic video capture device and retrieving the image frames once the exposure of the frame is complete. In certain embodiments of the capture module, the triggering of the sensors is not performed by this module. There is a separate trigger mechanism for the sensors and the capture module is notified of the event every time a new image frame is available on the panoramic video capture device. When this notification is received by the capture module, it retrieves the image frame from the panoramic video capture device.

As used herein, a processing module is operative to receive the raw frame from the capture module and applies the following filters to the raw frame:
  Demosaicing filter: In this filter, a full color image is reconstructed using the incomplete color samples from the raw image frames.
  Coloring filter: The full color image output from the demosaicing filter is then converted to appropriate color space (for example, RGB) for use in downstream modules.
  Seam blending filter: Colored images output from the coloring filter are used for blending the seam using stitching algorithms on the overlap between adjacent images.

As used herein a splicing module is responsible for using the images output from the processing module, and putting them together with the ends lined up against each other in such that the aggregate of these individual images creates one panoramic image.

Also as used herein, a slicing module takes the seam blended panoramic image, and splits this image into multiple slices. This is done so that each slice of the panoramic image can be distributed over the network in an optimized fashion. This overcomes the existing limitations of certain network protocols that cannot communicate panoramic images above a certain size of the image.

As used herein, a time stamp module listens for the time code from the time code generator. This time stamp is then attached to each slice of the image sections output from the slicing module.

As used herein, a compression module takes the image frame output by the time stamp module and compresses it using certain image compression techniques (JPEG, H.264, etc.) for transmission of over the network.

As used herein, a distribution device is a kind of router or switch that is used for transmitting the compressed frames over the network. Multiple clients could connect to the distribution device and receive the image frames being transmitted. In addition to this, subsequent distribution devices themselves could be connected to a distribution device transmitting the images for relaying the images over a wide network.

As used herein a client process processes the combination of sub-processes and modules on a viewer's machine to receiving image frames from a distribution device, store them in buffer, manage the user input from the user interaction devices, and display the video images to the end-user.

The client process is broken down into the following modules:
  A receiving module which connects to the source of the video images via the distribution device, receives the images over the network, and stores them in a buffer on the viewer's machine.
  A user interface module is used for managing the user input from the user interaction devices. In one of the implementations of the user interface module, the joystick controller is used for capturing the user input. The user input could be provided using buttons on the joystick or using the multiple thumb pad controls on the joystick.
    Different buttons are used to track the video playback state change input for play, pause, fast forward, rewind, or live mode
    A thumb pad control is used to track the viewport change inputs for zoom, pan, tilt of the view
    Another thumb pad control is used to track the transport control input for jogging forward or back based on the velocity of jog determined by how far the thumb pad control has been pushed.
  A display module is used for displaying portion of the panoramic video frames to the user. The portion of the video frame to be displayed is determined based on the inputs from the user interface module. Image frame from the buffer is fetched and based on the other user inputs, the portion of the panoramic image to be displayed is determined. This portion is then displayed to the end-user for viewing.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:
1. An apparatus comprising:
  at least one receiver, the at least one receiver to receive image data comprising a plurality of image frames; and
  a user interface to:
    receive input from a user interaction device; and determine a portion of the image data to be displayed, the image data including a first rendering of a first viewing angle and a second rendering of a second viewing angle, the first viewing angle and second viewing angle based on the input received from the user interaction device, the first rendering and the second rendering synchronized based on current display time, viewing speed, and temporal viewing direction.

2. The apparatus of claim 1, wherein the at least one receiver comprises a plurality of receivers.

3. The apparatus of claim 2, wherein the plurality of receivers receive the image data generated by a corresponding plurality of image capture devices that are synchronized using a hardware sync trigger.

4. The apparatus of claim 3, wherein the image data captured by the plurality of image capture devices is synchronized based on at least one of current display time, viewing speed, and viewing direction.

5. The apparatus of claim 1, wherein the input comprises at least one of pan, tilt, or zoom values, a selection of a portion of the image data in time to be viewed, a viewing speed, and a viewing direction.

6. The apparatus of claim 5, wherein the user interaction device generates one or more of a camera changed event, a video playback state changed event, a viewport changed event, or a transport control event based on the input.

7. The apparatus of claim 6, wherein the user interaction device is one of a joystick, a keyboard, a touch device, and a gesture-based device.

8. A non-transitory computer readable storage medium including instructions stored thereon which, when executed by a processor, cause the processor to:
receive image data comprising a plurality of image frames;
receive input from a user interaction device; and
determine a portion of the image data to be displayed, the image data including a first rendering of a first viewing angle and a second rendering of a second viewing angle, the first viewing angle and second viewing angle based on the input received from the user interaction device, the first rendering and the second rendering synchronized based on current display time, viewing speed, and temporal viewing direction.

9. The non-transitory computer readable storage medium of claim 8, wherein the instructions, when executed, further cause the processor to:
render the portion of the image data to be displayed.

10. The non-transitory computer readable storage medium of claim 8, wherein to receive image data comprising a plurality of image frames, the instructions, when executed, further cause the processor to:
receive the image data via a plurality of receivers, the image data generated by a corresponding plurality of image capture devices that are synchronized using a hardware sync trigger.

11. The non-transitory computer readable storage medium of claim 10, wherein the image data captured by the plurality of image capture devices is synchronized based on at least one of current display time, viewing speed, and viewing direction.

12. The non-transitory computer readable storage medium of claim 8, wherein the input comprises at least one of pan, tilt, or zoom values, a selection of a portion of the image data in time to be viewed, a viewing speed, and a viewing direction.

13. The non-transitory computer readable storage medium of claim 12, wherein the user interaction device generates one or more of a camera changed event, a video playback state changed event, a viewport changed event, or a transport control event based on the input.

14. The non-transitory computer readable storage medium of claim 13, wherein the user interaction device is one of a joystick, a keyboard, a touch device, and a gesture-based device.

15. A method comprising:
receiving image data comprising a plurality of image frames;
receiving input from a user interaction device; and
determining, by a user interface of a client, a portion of the image data to be display, the image data including a first rendering of a first viewing angle and a second rendering of a second viewing angle, the first viewing angle and second viewing angle based on the input received from the user interaction device, the first rendering and the second rendering synchronized based on current display time, viewing speed, and temporal viewing direction.

16. The method of claim 15, wherein receiving image data comprising a plurality of image frames, further comprises:
receiving the image data via a plurality of receivers, the image data generated by a corresponding plurality of image capture devices that are synchronized using a hardware sync trigger.

17. The method of claim 16, wherein the image data captured by the plurality of image capture devices is synchronized based on at least one of current display time, viewing speed, and viewing direction.

18. The method of claim 15, wherein the input comprises at least one of pan, tilt, or zoom values, a selection of a portion of the image data in time to be viewed, a viewing speed, and a viewing direction.

19. The method of claim 18, wherein the user interaction device generates one or more of a camera changed event, a video playback state changed event, a viewport changed event, or a transport control event based on the input.

20. The method of claim 19, wherein the user interaction device is one of a joystick, a keyboard, a touch device, and a gesture-based device.

* * * * *